United States Patent [19]

McGauran et al.

[11] 4,138,921
[45] Feb. 13, 1979

[54] FASTENER

[75] Inventors: Hugh K. McGauran, Harlow; John W. C. Saxon, Sawtry; Raymond D. Lacey, Essendon; Frederick A. Summerlin, Wheathamstead, all of England

[73] Assignee: Aerpat A.G., Zug, Switzerland

[21] Appl. No.: 817,487

[22] Filed: Jul. 20, 1977

Related U.S. Application Data

[63] Continuation of Ser. No. 659,589, Feb. 19, 1976, abandoned.

[30] Foreign Application Priority Data

Feb. 21, 1975 [GB] United Kingdom ................ 7440/75

[51] Int. Cl.² ........................................... F16B 21/00
[52] U.S. Cl. ........................................................ 85/7
[58] Field of Search ................ 85/15 P, 4, 7, 39, 8.6, 85/8.8, 77, 78, 72; 151/7; 24/208 A, 217 R; 403/372, 408

[56] References Cited

U.S. PATENT DOCUMENTS

| | | | |
|---|---|---|---|
| 2,785,453 | 3/1957 | Wentz | 85/8.8 UX |
| 2,926,409 | 1/1960 | Perry | 24/217 |
| 3,009,381 | 11/1961 | Rapata | 85/7 |
| 3,238,835 | 3/1966 | Rosenberg | 85/7 |
| 3,251,260 | 5/1966 | Serdechny | 85/7 |
| 3,276,308 | 10/1966 | Bergere | 85/72 |
| 3,295,404 | 1/1967 | Baker | 85/7 |
| 3,357,204 | 12/1967 | Davis | 24/217 X |
| 3,367,228 | 2/1968 | King | 85/7 |
| 3,369,289 | 2/1968 | Gapp | 85/72 X |
| 3,641,865 | 2/1972 | Swindt et al. | 85/7 |
| 3,702,088 | 11/1972 | Schmitt | 85/77 |
| 3,736,834 | 6/1973 | MacDonald | 85/7 |
| 3,779,127 | 12/1973 | Speakman | 85/7 |
| 3,938,587 | 2/1976 | Vian | 85/7 X |

FOREIGN PATENT DOCUMENTS

| | | | |
|---|---|---|---|
| 1350099 | 12/1963 | France | 85/8.8 |
| 204377 | 9/1965 | Sweden | 85/7 |
| 820917 | 9/1959 | United Kingdom | 85/1 JP |
| 881680 | 11/1961 | United Kingdom | 85/1 JP |

*Primary Examiner*—Thomas J. Holko
*Attorney, Agent, or Firm*—Oblon, Fisher, Spivak, McClelland & Maier

[57] ABSTRACT

A two-part fastener intended for securing, e.g., a panel 41 to a frame member 42 comprises a tubular shell 11 and a pin 12. The shell bore contains a tubular insert or slug 14 of resilient nylon material. The exterior of the pin is formed with annular barbs 30. When the pin is inserted into the shell, the barbs 30 engage in the resilient slug 14 to secure the pin and shell together. The pin includes a removable pintail 33 which protrudes beyond the shell and assists in the pulling of the pin into the shell by means of a suitable pulling tool.

6 Claims, 6 Drawing Figures

FASTENER

This is a continuation, of application Ser. No. 659,589, filed Feb. 19, 1976 now abandoned.

BACKGROUND OF THE INVENTION

The invention relates to a fastener, and more particularly a fastener for insertion through aligned holes in superposed members to secure the members together.

SUMMARY OF THE INVENTION

The invention provides, in one of its aspects, a fastener comprising:

a first part having a radially enlarged head at one end, an elongated shank protruding therefrom, and a bore extending axially completely through the head and shank, the interior of at least part of the bore carrying first engaging means;

a second part having a radially enlarged head at one end and an elongated shank protruding therefrom, the exterior of at least part of the shank carrying second engaging means;

the shank of the second part being insertable into the bore of the first part so that the first and second engaging means mutually engage;

the shank of the second part being sufficiently longer than the bore of the first part that, when the shank of the second part is inserted in the bore from the tail end thereof, the shank of the second part protrudes from the bore beyond the head of the first part, thereby enabling the first and second parts of the fastener to be pulled together to cause mutual engagement of the engaging means; and at least one of the engaging means being of resiliently deformable material and at least the other of the engaging means being of barbed form.

Preferably only one of the engaging means is resiliently deformable, the other engaging means being rigid.

Preferably only one of the engaging means is of barbed form.

In a preferred embodiment of the invention, the first engaging means is resiliently deformable, and the second engaging means is of barbed form. Thus, the first engaging means may comprise a resiliently deformable sleeve (e.g., of nylon-66 material) which provides the wall of the bore of the first part of the fastener. The sleeve may be retained in the shank of the first part of the fastener by means of an inward flange at the tail end thereof (i.e., the end thereof remote from the head).

The second engaging means may comprise one or more annular barbs on the exterior of the shank of the second part of the fastener.

The shank of the second part of the fastener may include a pulling portion at the end thereof remote from the head and beyond the second engaging means, such that the pulling portion protrudes from the bore, beyond the head of the first part, thereby enabling the first and second parts of the fastener to be pulled together, the pulling portion being thereafter detachable from the remainder of the shank, e.g., by breaking off.

BRIEF DESCRIPTION OF THE DRAWINGS

A specific embodiment of the invention will now be described by way of example, and with reference to the accompanying drawings in which.

DETAILED DESCRIPTION OF THE ILLUSTRATED EMBODIMENT

Figure 1:
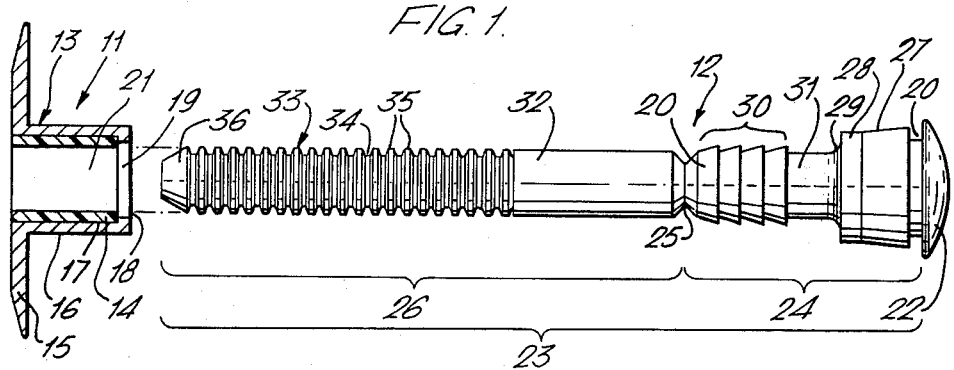
FIG. 1 shows the two parts of a fastener according to the invention, the first part being shown in axial section and the second part in side elevation.

The fastener of this example is specifically intended for use in the construction of freight transport containers. These are commonly constructed of plywood or other similar panels secured to metal frames, and the fastener is intended for use in securing the plywood skin to the metal frame.

The fastener is of simple construction, comprising a first part or shell 11 and a second part or pin 12. The first part 11 comprises a tubular steel outer member or body 13 and a nylon-66 tubular inner member in the form of a sleeve member or slug 14. The steel shell comprises a radially enlarged head 15 of low profile and a tubular elongated shank 16 protruding centrally from the head, the tubular shank and head having a cylindrical bore 17 extending axially completely through them. The tail end of the shank (i.e. the end thereof remote from the head 15) is formed with an inwardly extending flange 18, surrounding and defining a circular aperture 19, so that the tail end of the bore 17 is of reduced diameter. The interior of the bore 17 carries the first engaging means in the form of the tubular nylon-66 sleeve or slug 14. This extends axially from the head end of the bore 17 up to the flange 18. The exterior diameter of the slug 14 is such that the slug is a push fit in the bore 17. The interior diameter of the slug is somewhat less than that of the aperture 19 inside the flange 18. Thus, the bore 21 inside the slug 14, and the aperture 19, are contiguous and together extend completely through the first part 11 of the fastener.

The second part, or pin 12, of the fastener is also made of steel, and is of unitary form comprising essentially an enlarged head 22 at one end, and an elongated shank 23 extending from the head. The pin shank 23 may be considered as comprising three parts namely; a main part 24 adjacent the head 22, a breakneck 25, and a removable pintail 26.

These parts may be further subdivided as follows (in order successively away from the pin head 22).

The main part 24 comprises first an undercut portion 10; then a taper 27 (larger ends towards the head 22), then a short cylindrical collar portion 28 equal in diameter to the narrow end of the taper 27; then a transition portion 29 of concavely curved profiler and; then a cylindrical portion 31 of substantially smaller diameter than the portion 28. Next comes a barbed portion 30 comprising a plurality of annular barbs 20, shown here being four in number. These barbs 20 face towards the pin head 22. The barbed portion 30 adjoins the breakneck 25, which is, of course, the weakest part of the shank.

The pintail 26 may be similarly subdivided as follows. Adjacent the breakneck 25 is a plain cylindrical portion 32 of diameter slightly less than of the portion 31. Then comes a pulling portion 33, which is formed with a number of annular grooves 34 alternating with annular ridges or lands 35. These ridges can be gripped by suitably-shaped jaws of a pulling tool, as will be described later. Last of all, adjacent its tail end the pintail has a bevelled portion 36 which facilitates entry of the pin into the bore 21 and into the pulling tool.

The pin shank 23 is insertable into the shell bore 21 so that the barbs 20 engage in the nylon slug 14. Clearly this imposes some relative dimensional conditions on the two parts of the fastener. Firstly, the pintail 26 must not interfere with the slug 14, i.e., the pintail 26 must be at least a sliding fit in the slug bore 21. Secondly, the external diameter of the barbs 20 must be greater than the diameter of the slug bore 21, but less than the diameter of the shell tail aperture 19. Other dimensional desiderata will become apparent later.

Figure 2:
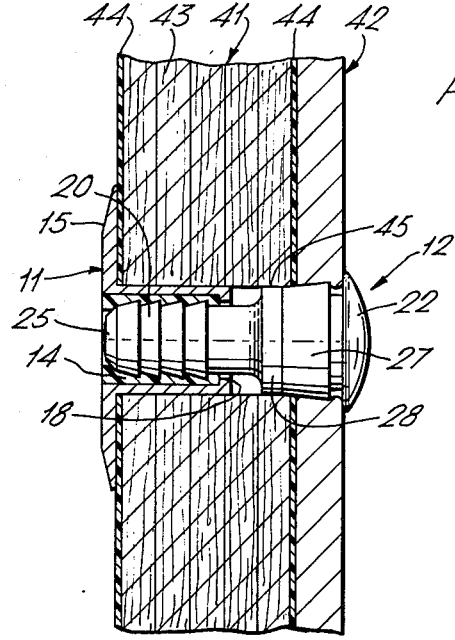
FIG. 2 shows, in axial section, the two parts of the fastener assembled together and mutually engaged to secure two members together.

For ease of understanding of how the fastener is used, FIG. 2 will now be considered. This shows the fastener used in the construction of a freight transport container to secure a panel member 41 to a steel frame member 42. The skin member 41 consists of a plywood core 43 to each face of which is bonded a thin skin 44 of glass-reinforced plastic (or GRP). The fastener is installed through a circular hole 45, of a diameter slightly larger than that of the narrow end of the pin taper 27. The pin 12 has been inserted through the frame 42, and the shell 11 has been inserted through the panel 41. The shell head 15 abuts the panel 41, and the pin head 22 abuts the frame 42, these two heads clamping the panel and frame together. The pin and shell are held together by the barbs 20 embedded in the nylon slug 14, the direction of the barbs preventing the pin from retreating out of the shell. The slug 14 is retained in the shell by the tail end flange 18. The pintail has been broken off at the breakneck 25 which is just below the face of the shell head 11. The tapered portion 27 of the pin main stem spans the interface between the frame 42 and panel 41 to provide shear strength.

Figure 3A:
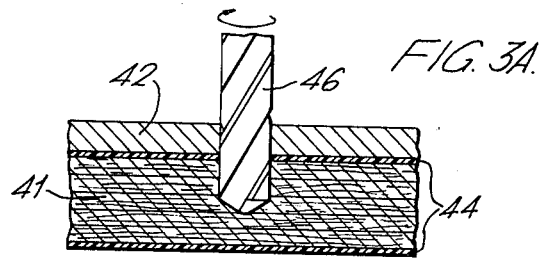
FIGS. 3A to 3D are views similar to FIG. 2, somewhat simplified, and illustrate successive steps in the installation of the fastener in two members to secure them together.
Figure 3B:
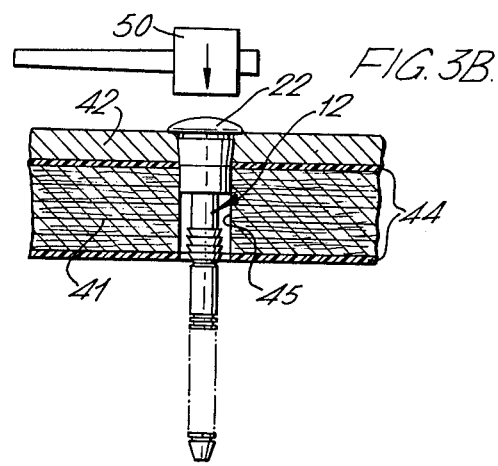

FIGS. 3A, 3B, 3C and 3D illustrate how the fastener is placed, by showing successive stages in that operation. The first step, shown in FIG. 3A, is the drilling (by means of a suitable drill 46) of a hole through both the frame 42 and the panel 41. Since the second step (see FIG. 3B) is also made from the frame side of the members, it is easier to start by drilling the hole from that side. The diameter of the hole is, as previously mentioned, slightly larger than that of the narrow end of the pin taper 27, so as to provide an interference fit between the wider end of the taper 27 and the hole in the steel frame. The second step (FIG. 3B) is the insertion of the pin 12, tail first, into the hole 45, from the frame side. The pin taper 27 under the pin head forms an interference fit in the near end of the hole 45 in the frame 42, and so the pin is driven in (e.g., by means of a hammer 50) until the pin head 22 abuts the frame 42. This interference does two things. Firstly, it secures the pin in the frame until installation of the fastener is completed, and secondly, it provides a seal between the pin and frame. Note that, as illustrated in FIG. 2, the length of the taper 27 is not much greater than the thickness of the frame 42, consequently the taper 27 does not interfere with the panel and tend to push it away from the frame. The undercut portion 10 immediately adjacent the head 22 provides, if necessary, a space to accommodate material from the metal frame 42 which may be piled up if the pin is placed in a hole 45 which is at or near the bottom limit of hole diameter tolerance. Although, in FIGS. 3A and 3B, the panel and frame are shown in contact, they need not be, and in practice there is often a gap between them to start with. One advantage of the fastener of this example is that it pulls the panel and frame together as it is installed, as will be described below.

The next two steps are both effected from the panel side of the members.

Figure 3C:
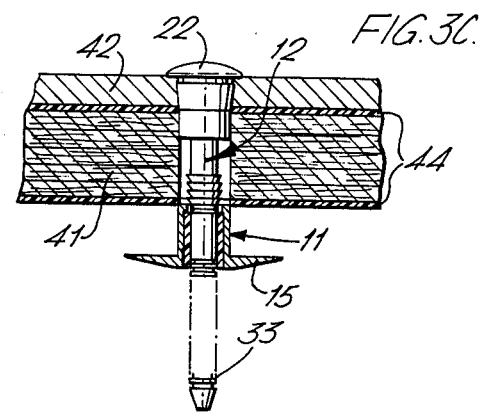
Figure 3D:
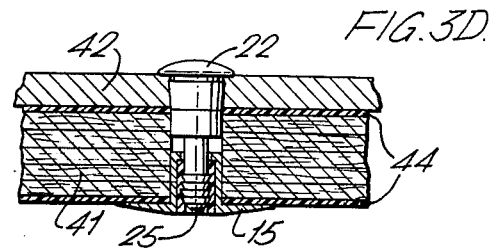

FIG. 3C shows the next step.

The shell 11 is offered up, tail first, over the protruding pin tail, until the tail-most end of the shell meets the near face of the panel 41. The pulling portion 33 of the pintail 26 then protrudes from the shell. The outside diameter of the shell is a close fit in the hole through the panel, so that no great force is required to push it into the hole, but some force is needed to push the barbs 20 into the nylon slug 14. This is achieved by means of a pulling tool of the type used to install lock bolts of the "pin-and-swaged-collar" type, well known in the art of mechanical fasteners and commercially available (for example) under the trade mark AVDELOK. Such a pulling tool essentially comprises a tubular body with an annular anvil at one end for engaging a collar, gripping jaws behind the annular anvil to grip a pintail offered through the anvil, and pulling means for causing the jaws to grip the pintail and retract them to pull the pintail through the collar. A similar tool is used for installing the fastener of the present example, with the differences (a) that the anvil does not need to swage a collar, but is designed to abut the shell head 22, and (b) the strength of pull required to place the present fastener is less than that required to swage a lockbolt collar.

Thus, the tool is offered up over the pulling portion 33 of the projecting pintail until the tool anvil contacts the shell head 15. The tool is then actuated to grip the annular ridges 35 on the pulling portion and retract the pintail, i.e. to make the anvil push the shell into the hole and towards the head 22 of the pin 12. The barbs 20 on the pin are forced into the nylon slug, thus engaging it. The shell head then contacts the near face of the panel, and if there is any gap between the panel and frame, the action of the tool closes this gap and squeezes the panel and frame together, between the pin head 22 and shell head 15.

When the pin head and shell head cannot move any closer together, because of the panel and frame between them, continued operation of the pulling tool increases the pull on the pintail 33, until the pin fractures at the breakneck 25. This completes the installation of the fastener. As previously mentioned, the pin and shell are held together against separation by the action of the barbs 20 embedded in the nylon slug 14.

The fastener described in the foregoing example is advantageous in a number of respects, amongst which are the following:

(a) it is of simple construction, comprising only two steel parts plus one tubular nylon slug;

(b) the hole diameter in which it is installed is not critical, since the hole diameter may be any value between the minimum and maximum diameters of the pin taper 27;

(c) the total thickness (i.e. the "grip") of the panel and frame is not critical, since the pin and shell are adequately locked together even if only one barb 20 enters the nylon slug 14, the breakneck groove 25 then being inside the shell, so that after break-off there is no protruding rough surface;

(d) whilst accommodating the tolerances set out in (b) and (c) above, the fastener provides a watertight and gastight seal between the pin taper and frame, in addition to the sealing compound which is normally provided between the panel and frame (pressures of up to 40 lbs per sq. in. have been withstood on test) and, moreover, this seal is provided immediately adjacent the pin head which is normally on the outer face of the container:

(e) while being placed, the fastener can close a gap between the panel and frame;

(f) installation requires access only to, firstly, the frame side of the work (for the first two steps), and then to the panel side of the work (for the remainder of the operation), instead of repeated access to opposite sides alternately; and (g) the fastener cannot be removed without drilling out the pin, so that it is effectively tamper proof.

The invention is not restricted to the details of the foregoing example. For instance, the resilient engaging means in the shell need not be a solid slug, but could be built up from separate resilient lamellae, e.g., a stack of spring "star" washers with points directed inwardly, or a stack of "Believille" spring washers, provided that whatever is used will properly engage the barbs on the pin. Alternatively, it would be possible to make the shell of resilient material (e.g. nylon-66) integral with the resilient engaging means. However, two problems would then arise, one being that the thickness of the shell shank wall would have to be greatly increased in order to make it strong enough not to expand radially and permit the barbs to be withdrawn, and another that the shell head would have to be very thick to make it strong enough.

The engaging means on the pin may comprise a lesser number of annular barbs than four, as for example, a single barb only may be provided.

What is claimed as new and desired to be secured by Letters Patent of the United States is:

1. A fastener for fastening together apertured members of a workpiece, comprising a shell and a pin, the shell comprising a tubular body and a tubular sleeve, p1 the tubular body being formed of strong, rigid material and having an elongate shank, a radially enlarged head for abutting one face of the workpiece at one end of the shank, a bore throughout the head and shank and an annular retaining flange at the other end of the shank, said flange extending radially inwardly into the bore of the shank and defining a central aperture coaxial with the bore, the tubular sleeve being formed of a resiliently deformable material, and disposed within the bore of the body in abutment with said retaining flange, said sleeve having throughout its length a smooth bore of a substantially constant diameter which is less than that of said central aperture and forming a continuous lining within the bore of the body, the sleeve being supported externally throughout its length by the body;

the pin of the fastener being formed of rigid material and comprising an elongate shank and a radially enlarged pin-head for abutting an opposite face of the workpiece at one end of the shank, the shank of the pin having a main part adjacent to the pin-head, a pin-tail remote from the pin-head and a weakened portion between the main part and the pin-tail, the main part having integral barb means directed towards the pin-head for embeddedly engaging the tubular sleeve of the shell, that part of the pin-shank between the barb means and the end of the pin remote from the pin-head being a clearance fit in in the bore of the sleeve and the barb means being able to pass through the central aperture of the body and, by resiliently deforming the sleeve, to enter the bore of the sleeve, the shank of the pin being of sufficient length to extend entirely through members of a workpiece to be fastened together and to enable the pin-tail to be gripped and pulled by a tool for installing the fastener, so that the shank of the pin may be pulled to cause the barb means to enter the bore of the tubular sleeve at the end thereof remote from the head of the shell and to embed in non-retreat engagement in the sleeve.

2. A fastener according to claim 1, wherein the barb means comprises a plurality of annular barbs each directed towards the pin-head.

3. A fastener according to claim 1, wherein the barb means is immediately adjacent to the weakened portion.

4. A fastener according to claim 1, wherein the barb means is spaced from the pin-head, the pin having between the barb means and the pin-head a cylindrical collar portion having an external diameter substantially the same as the external diameter of the shank of the tubular body.

5. A fastener according to claim 4, wherein the pin has, between the pin-head and said cylindrical collar portion, tapering means for providing interfering engagement in an aperture of a workpiece member being fastened, said tapering means having a minor external diameter substantially equal to that of the shank of the body, the diameter of said tapering means increasing towards the pin-head to a maximum diameter less than that of the pin-head.

6. A fastener according to claim 1, wherein the tubular sleeve extends substantially the entire length of the bore of the body.

* * * * *